United States Patent
Pai et al.

(10) Patent No.: US 10,248,933 B2
(45) Date of Patent: Apr. 2, 2019

(54) CONTENT ITEM ACTIVITY FEED FOR PRESENTING EVENTS ASSOCIATED WITH CONTENT ITEMS

(71) Applicant: Dropbox, Inc., San Francisco, CA (US)

(72) Inventors: Anvisha Pai, San Francisco, CA (US); Michael Wu, San Francisco, CA (US); Martin Pedrick, New York, NY (US); William Trueman Wood, San Francisco, CA (US); Shravan Gottipalli Reddy, Fremont, CA (US)

(73) Assignee: Dropbox, Inc., San Francisco, CA (US)

( * ) Notice: Subject to any disclaimer, the term of this patent is extended or adjusted under 35 U.S.C. 154(b) by 388 days.

(21) Appl. No.: 14/983,094

(22) Filed: Dec. 29, 2015

(65) Prior Publication Data
US 2017/0185687 A1    Jun. 29, 2017

(51) Int. Cl.
*G06F 17/30* (2006.01)
*G06Q 10/10* (2012.01)
*H04L 12/58* (2006.01)

(52) U.S. Cl.
CPC ..... *G06Q 10/101* (2013.01); *G06F 17/30864* (2013.01); *H04L 51/046* (2013.01)

(58) Field of Classification Search
USPC .......................................... 707/722
See application file for complete search history.

(56) References Cited

U.S. PATENT DOCUMENTS

| | | | | |
|---|---|---|---|---|
| 2001/0042073 | A1* | 11/2001 | Saether | G06F 17/30194 |
| 2013/0332523 | A1* | 12/2013 | Luu | G06Q 30/0251 |
| | | | | 709/204 |
| 2015/0379879 | A1* | 12/2015 | Selkirk | G06Q 10/00 |
| | | | | 434/309 |

* cited by examiner

*Primary Examiner* — Tuan A Pham
*Assistant Examiner* — Muluemebet Gurmu
(74) *Attorney, Agent, or Firm* — Fenwick & West LLP

(57) ABSTRACT

A content management system aggregates and provides users' interaction with a content item for display in an activity feed. Events corresponding to the users' interaction with the content item are provided in conjunction with a user interface of a native application displaying the content item. Though provided in conjunction with the native application, the events are maintained separate from the content data of the content item and displayed in the activity feed by an application separate from the native application of the content item. The activity feed permits users to exchange chat messages and retrieve information for multiple versions of the content item.

15 Claims, 9 Drawing Sheets

CONTENT ITEM ACTIVITY FEED FOR PRESENTING EVENTS ASSOCIATED WITH CONTENT ITEMS

BACKGROUND

This disclosure relates generally to facilitating collaborating on content items, and particularly to synchronizing interactions with content items among collaborators.

Content management systems permit devices to synchronize content items with a content management system and other devices. A device stores a local copy of content items. When content items are added, deleted, or edited on a device, these modifications are sent to the content management system for storage and synchronization with other devices. To interact with a content item, users typically execute a native application on the device to view and modify the content item. Modifications to a content item may be synchronized with the content management system separately from the execution of the native application.

Accordingly, multiple users may use respective devices to separately view and edit a particular content item. When multiple users collaboratively edit, draft, or otherwise work with the same content item; however, it becomes difficult for the users identify changes made by other users, to determine if they have opened the latest version of the content item, to know if other users have made changes to the content item since they last opened the content item, and so forth. Such an environment where multiple users are separately viewing and editing a content item can lead to confusion and other inefficiencies.

SUMMARY

A content management system maintains events related to a content item that correspond to users' interaction with the content item and provide the events for display in an activity feed to client devices of various users that collaborate on the content item. The activity feed includes a list of event notifications that provide users with information of all users' interaction with the content item. The activity feed provides users who have access to the content item with edits and comments the content item, previews of edits and previous versions of the content item, whether edits and comments have been seen by other users, different versions of the content item, and/or messages exchanged with other users.

A computing device, via a client application of the content management system, stores a local copy of a content item that is also stored, maintained, and synchronized between devices by the content management system. The device also includes a native content application, such as a word processor, media viewer, media editor, and so forth that can be used to access the content item. The native application displays content data of the content item in a user interface element, such as a window. The client application is programmatically configured to interact with the content management system and access the events related to the content item to monitor activity or interactions with the content item on the device and communicate information about these events to the content management system, which then provides this data to other devices sharing the content item. The client application provides a particular user's interaction with the content item including event data that describe an event to the content management system. The content management system aggregates events from various devices and provides the aggregated events to each device. Event data includes, for example, the user generating the event, the type of event, when the event occurred, what version of the content item the event corresponds to, and so forth, to facilitate collaboration between users.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
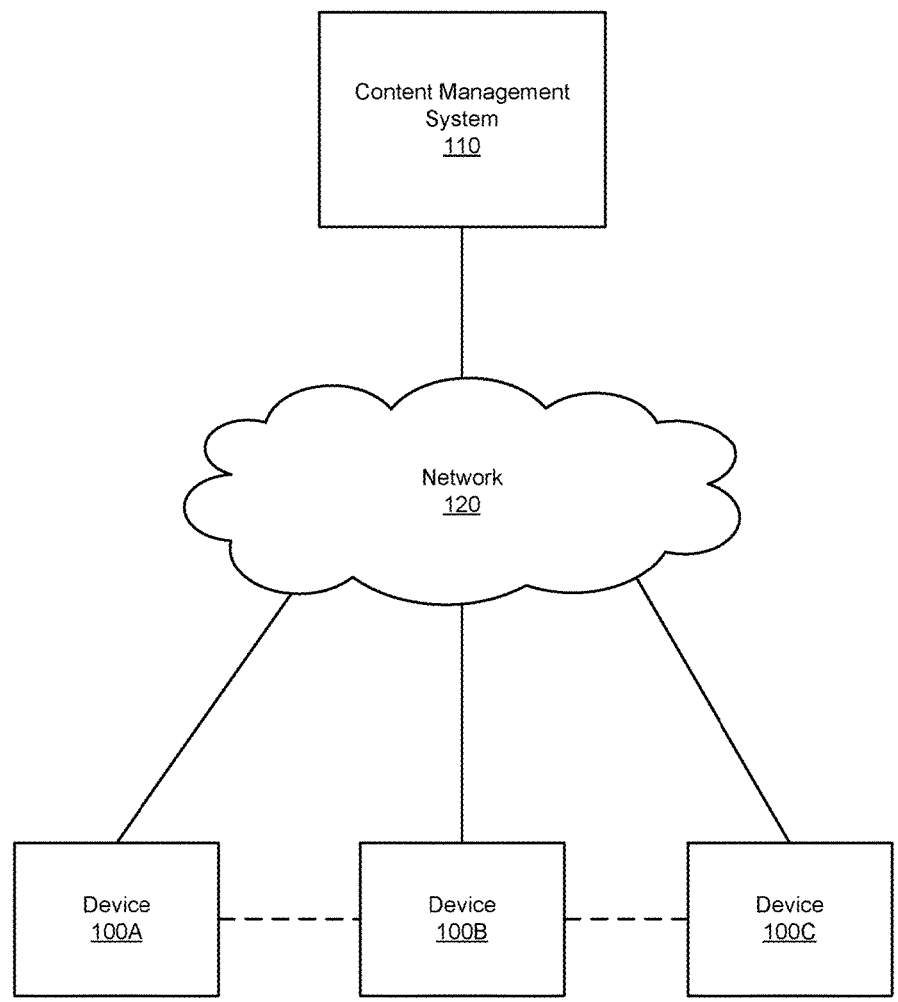
FIG. 1 shows an embodiment of an environment for content item synchronization including the display of event information to other users in a shared environment.

FIG. 1 shows an example system environment for content item synchronization providing users with an activity feed of events associated with a content item to facilitate collaborative editing of content items. Events associated with the content item represent users' various interactions with the content item such as retrieving/opening, editing, commenting on, reviewing, closing/saving, and sharing a content item, as well as sending messages to other users. FIG. 1 includes devices 100A, 100B, 100C (referred to generally as devices 100), content management system 110, and network 120. Three devices are shown for purpose of illustration; in practice, however, any number of devices may be present in the environment. Similarly, other modules or components described and illustrated throughout may include single or multiple instances as appropriate to the needs of the implementer and without loss of generality.

Devices 100 may be any suitable computing device for locally storing and viewing content items and synchronizing the content items with content management system 110. Examples of devices include desktop and laptop computers, hand-held mobile devices, tablet computers, and other computing devices. The operation of device 100 in various embodiments is further described below. In particular, each device 100 is configured by particular client application 200 (described with respect to FIG. 2) that extends the operation of device 100 beyond the functionality for a generic computer device, as will be further described, and thereby improves the overall functionality of device 100.

Each device 100 communicates with content management system 110 through network 120. Network 120 is any suitable network and may include local networks, corporate networks, global networks, and any combination of these. In typical configurations, devices 100 communicate via a wired or wireless communication network to a local network service provider, and communicate with content management system 110 through the Internet.

Content management system 110 provides content sharing and synchronization services for users of devices 100. These services allow users to share content with users of other devices 100. In addition to content sharing, content management system 110 updates shared content responsive to changes and enables synchronized changes to content items across multiple devices 100. Users who register with content management system 110 are provided with a user account and a user may synchronize content across multiple devices 100 associated with the user's account, and the user may share content that is synchronized with devices associated with other users' accounts.

Content stored by content management system 110 can include any type of data, such as digital data, documents, media (e.g., images, photos, videos, audio, streaming content), data files and databases, source and object code, recordings, and any other type of data or file, collectively referred to here as "content items." Content items stored by content management system 110 may also be used to organize other content items, such as folders, tables, collections, albums, playlists, or in other database structures (e.g., object oriented, key/value etc.). In practice, various devices 100 will be synchronized with different groups of content items, based on user associations, permissions, content sharing permissions, and so forth. The operation of content management system 110 in various embodiments is further described below.

Figure 2:
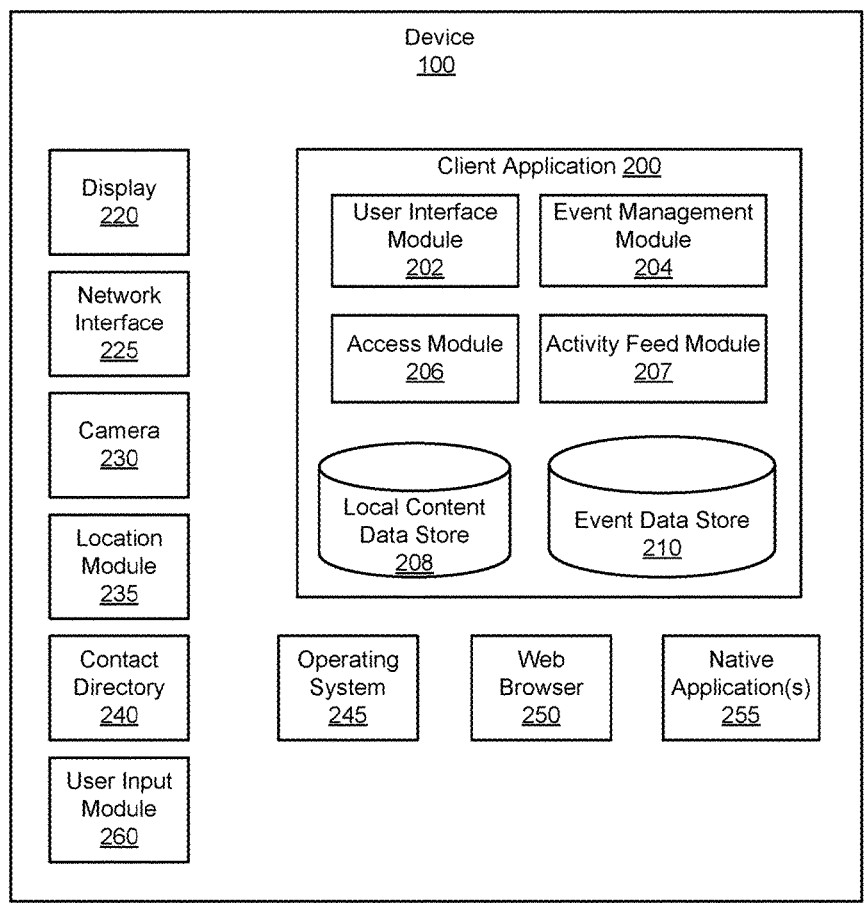
FIG. 2 shows various modules and components of a device, according to one embodiment.

FIG. 2 shows exemplary modules and components of device 100 in accordance with one embodiment. Device 100 includes display 220 for providing information to the user, and in certain client devices 100, display 220 may be a touchscreen. Device 100 also includes network interface 225 for communicating with content management system 110 via network 120. Device 100 also includes user input module 260, which receives user inputs from various user input devices, such as a keyboard, a mouse, a trackpad, or other device. Other conventional components of device 100 that are not material are not shown, for example one or more computer processors, local fixed memory (RAM and ROM), as well as optionally removable memory (e.g., SD-card), power sources, and audio-video outputs.

Software modules include operating system 245 and one or more native applications 255. Native applications 255 vary based on client device, and may include various applications for creating, viewing, consuming, and modifying content stored on content management system 110, such as word processors, spreadsheets, database management systems, code editors, image and video editors, e-book readers, audio and video players, and the like. Operating system 245 on each device provides a local file management system and executes the various software modules such as content management system client application 200 and native application 255. A contact directory 240 stores information about the user's contacts, such as name, picture, telephone numbers, company, email addresses, physical address, website URLs, and the like. Further operation of native applications 255, operating system 245, and content management system client application 200 are described below.

Device 100 may include additional components such as camera 230 and location module 235. Camera 230 may be used to capture images or video for upload to the online content management system 110. Location module 235 determines the location of device 100, using for example a global positioning satellite signal, cellular tower triangulation, or other methods. Location module 235 may be used by client application 200 to obtain location data and add the location data to metadata about a content item, such as an image captured by camera 230.

Client device 100 accesses content management system 110 in a variety of ways. Client application 200 can be a dedicated application or module that provides access to the services of content management system 110, providing both user access to shared files through a user interface, as well as programmatic access for other applications. Client device 100 may also access content management system 110 through web browser 250 by signing into a user account through a content management system webpage. As an alternative, client application 200 may integrate access to content management system 110 with the local file management system provided by operating system 245. When access to content management system 110 is integrated in the local file management system, a file organization scheme maintained at content management system 110 is represented as a local file structure by operating system 245 in conjunction with client application 200. Client application 200 may take various forms, such as a stand-alone application, an application plug-in, a browser extension, and so forth. Client application 200 includes user interface module 202, event management module 204, access module 206, activity feed module 207, local content data store 208, and event data store 210. The various modules and data stores are described separately throughout this disclosure for convenience and in various implementations may be combined or further divided into separate components as desired. The client application 200 generally, and the various modules specifically, are not conventional or routine elements of generic computing device 100.

Activity feed module 207 provides a user-interface activity feed displayed with the content item and includes a list or history of users' interactions with a content item, and is one means for performing these functions. Users' interactions with the content item include, for example, when a user reviews the content item, edits the content item (i.e., changes the content data of a content item), comments on the content item, views other users' interaction with the content item such as changes or comments, renames the content item, creates a new version of the content item, shares the content item, and so forth. Activity feed module 207 displays a list of event notifications corresponding to users' interactions with the content item in the user-interface activity feed. That is, activity feed module 207 displays a list of event notifications corresponding to events associated with the content item. Activity feed module 207 may display event data associated with the events that are related to the content item in the user-interface activity feed. Event data, for example, includes a time stamp associated with the event, an event type (e.g., comment, view, edit, retrieve/open, save/close) associated with the event, the content (e.g., texts and/or images of the comment, the specifics of the edit) of the event, a content item version, and one or more associated events. Activity feed module 207 allows a user to configure which events and/or event data associated with the events should be displayed in the user-interface activity feed. For example, a user may configure to mute events with the event types of retrieve or open, in which case activity feed module 207 does not display event notifications corresponding to users retrieving or opening content items. As another example, a user may configure not to show event content of events and activity feed module 207 does not display details of other users' edits.

The activity feed provides the content of the content item to all users that work on a content item. Event notifications indicate to various users that work on the content item of all users' interaction with the content item. Activity feed module 207 may present events that are associated with each other as one event notification. In various embodiments, activity feed module 207 presents those events that are associated with the section of a content item that is being currently presented to a user. When the user requests to view another section of the content item, activity feed module 207 presents other events that are associated with the other section of the content item. Activity feed module 207 presents the event notifications chronologically in the user-interface activity feed. Within each event notification, activity feed module 207 presents the events chronologically according to the event time stamps.

Content management system 110 may store each event in a manner that persistently associates the events with one or more particular content items. Accordingly, information related to a content item that is helpful to the collaborative drafting, editing, and review of the content item can be displayed in the activity feed with the content item. The activity feed is stored separately from the native application of the content item and separate from the data of the content item itself; this is beneficial since it allows the activity feed and the events therein to be associated with multiple different versions of a given document. In some embodiments, the activity feed may be displayed cohesively with the native application. In some embodiments, the activity feed is displayed separately from the native application of the content item. In some embodiments, activity feed module 207 provides a message or chat interface enabling users to send public or private messages to one or more other users who also work on the content item. A user can send messages to users who are online or offline. Further, maintaining the events separate from the content items themselves enables users who do not have access to the native content application can review context of content items in the activity feed thereby to contribute to the collaboration. This further extends the functionality of device 100 beyond its generic capabilities.

Event management module 204 receives and processes events for providing to activity feed module 207 for display, and is one means for performing this function. Event management module 204 receives events related to a content item from the content management system (e.g., an event module of the content management system). The events received include various users' interaction with the particular content item. In addition, event management module 204 receives events including the particular user's interaction with the content item from access module 206 and provides these events to the content management system (e.g., an event module of the content management system). In addition, event management module 204 may further receive events including the particular user's interaction with the content item from activity feed module 207 and provides these events to the content management system (e.g., an event module of the content management system). Event management module 204 provides events including the particular user's interaction with the content item to the content management system in real time. For a particular content item, event management module 204 sends events including a particular user's interaction with the content item to the content management system in real time. The content management system receives events including various users' interactions with the content item from various user devices. Periodically, event management module 204 receives events including various users' interaction with the content item from the content management system. As such, event management module 204 obtains and manages information with respect to users' interaction with a particular content item.

Each event comprises event data such as an event type (e.g., comment, view, revision, message, retrieve/open, save/close), a user ID, a content item ID (e.g., a unique ID, file name, pathname, or the like), a content item version, a time stamp, an event content (e.g., texts and/or images of the comments, the specifics of the revision), and/or an associated event ID. For example, a first event of a user reviewing another user's comment on a content item is associated with a second event of the other user's commenting on the content item. For events with the message event types, the event data may further include a recipient user ID and the message type (e.g., private or public). It should be appreciated that event management module 204 could alternatively reside with content management system 110 or at least some of the processes described herein can be performed by content management system 110. Event management module 204 may store the events including the associated event data in event data store 210.

In addition, event management module 204 processes the events received from content management system 110 and/or access module 206 prior to providing to activity feed module 207 for display. Event management module 204 receives, periodically from content management system 110, events that content management system 110 has received from different devices. Event management module 204 processes the events according to the time stamps, event types, and/or the content of the events such that the events provided to activity feed module 207 are organized. For example, event management module 204 orders the events received according to the associated time stamps. Event management module 204 may associate each event with the relevant section (e.g., page, paragraph, etc.) of the content item. In addition, event management module 204 may associate those events that are associated with the same section of the content item with each other. In one event notification, the associated events may be presented chronologically. Furthermore, event management module 204 may associate events based on their content. For example, event management module 204 may process the content of the comments or messages to determine the topic and associate those comments or messages having the same topic.

Access module 206 provides event management module 204 with a particular user's interaction with a content item as events, such as when a user opens or closes a content item, edits a content item, comments on a content item, and renames or creates a new version of a content item, and is one means for performing this function. For example, when a user edits a content item, access module 206 receives data corresponding to the edits the user makes to the content item and creates an event including the event data such as the time stamp, the user ID, the specifics of the edits, and the like. As another example, when a user has viewed a comment (or edits) made by another user, access module 206 receives corresponding data and creates an event. Access module 206 sends the event to event management module 204, and event management module 204 sends the event to content management system 110. In one embodiment, access module 206 may additionally provide interaction information for user submitted messages received via the activity feed to event management module 204. Alternatively, the interaction information for message events may be provided to event management module 204 by activity feed module 207.

Client application 200 may store accesses from a content storage at content management system 110 in local content data store 208. While represented here as within client application 200, local content data store 208 may be stored with other data for client device 100 in non-volatile storage. When local content data store 208 is stored this way, the content is available to the user and other applications or modules, such as native application 255, when client application 200 is not in communication with content management system 110.

Access module 206 manages updates to local content data store 208 and uses a synchronization logic to communicate with content management system 110 to synchronize content modified by client device 100 with content maintained on content management system 110, and is one means for performing this function. One example of such synchronization is provided in U.S. Pat. Pub. 2015/0012488 filed Sep. 27, 2013 and is hereby incorporated by reference in its entirety.

Accordingly, device 100 receives content items from content management system 110, stores such items to local content data store 208, where they may be accessed and edited with various native applications 255 stored on device 100. For example, device 100 may include a photo editing application that manipulates image content items, a word processing application that permits modification of text content items, or a computer-aided design (CAD) application that permits modification of drawing content items. Additionally, content management system 110 can share a content item with other users upon user request and provide users with read and write access.

Figure 3A:
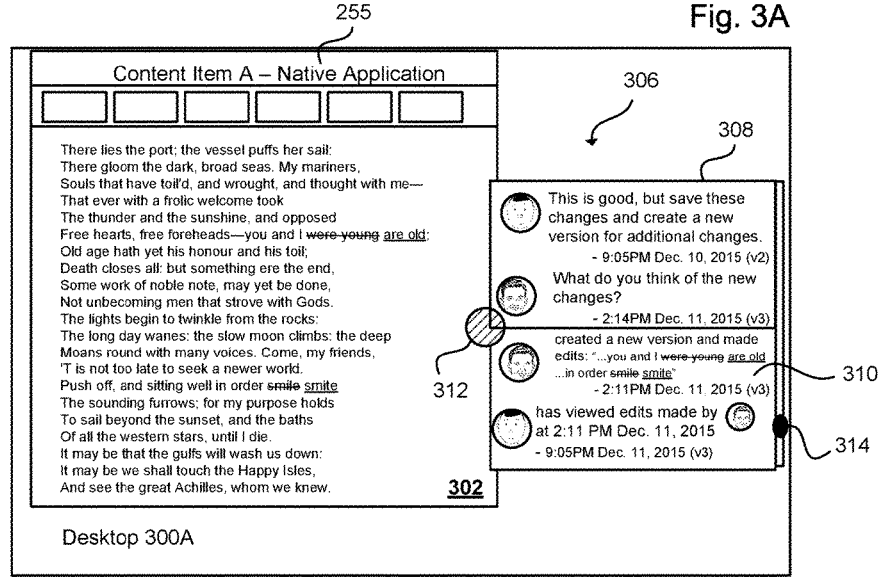
FIGS. 3A and 3B illustrate displaying a content item with an activity feed across user devices, according to one embodiment.
Figure 3B:
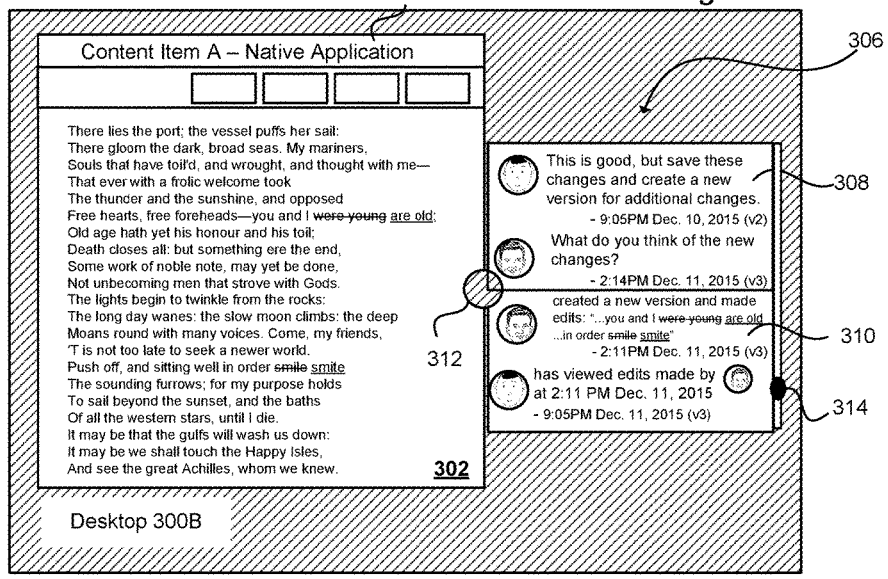
Figure 4A:
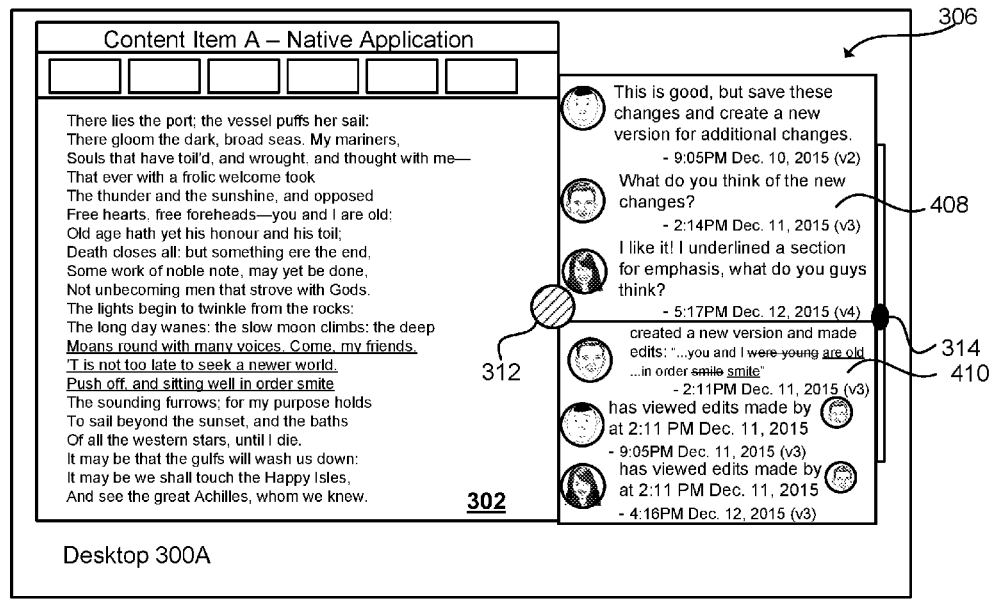
FIGS. 4A and 4B illustrate displaying a content item with an activity feed across user devices, according to one embodiment.
Figure 4B:
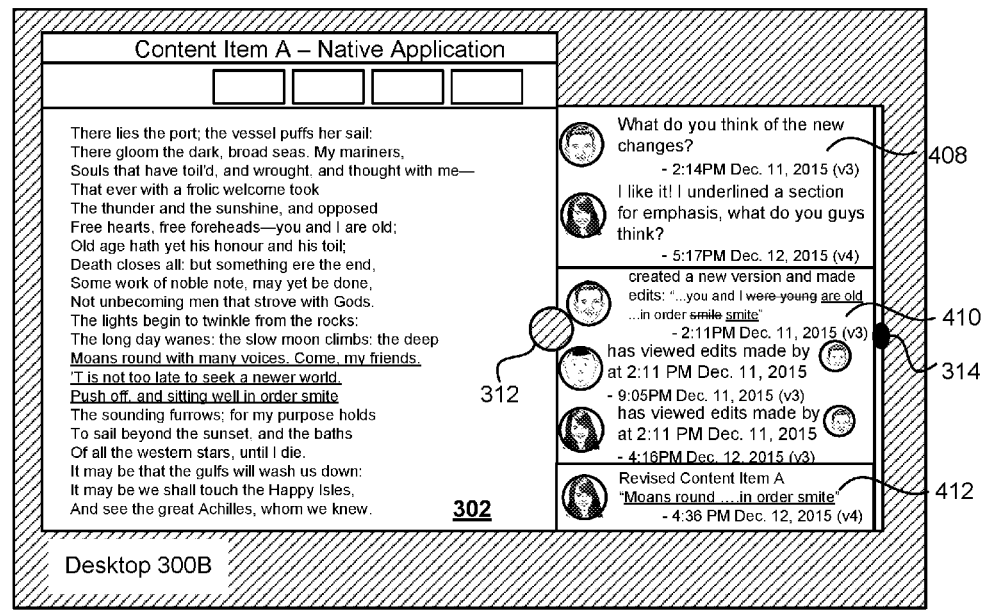
Figure 5:
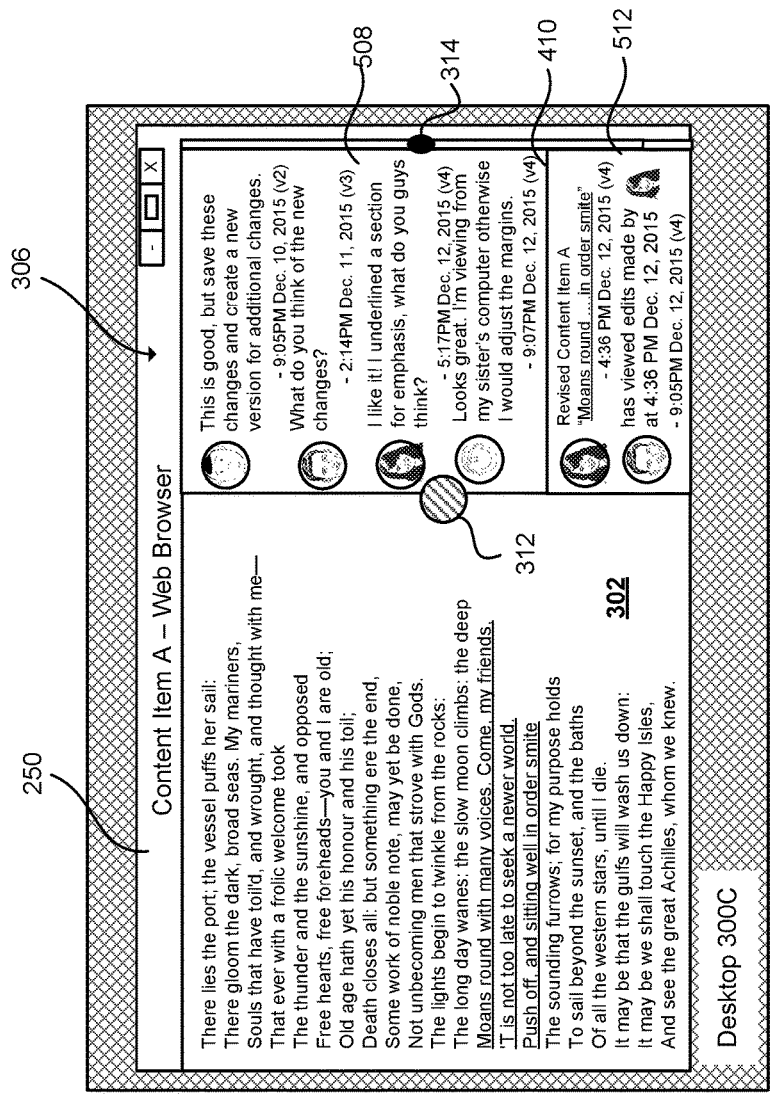
FIG. 5 illustrates displaying a content item with an activity feed in a web browser, according to one embodiment.

FIGS. 3-5 illustrate examples of the collaborative editing that includes multiple users interacting with content item 302. FIGS. 3A and 3B show content item 302 displayed on desktop 300A to a first user (clear background) while content item 302 is also displayed on desktop 300B to a second user (striped background). In this example, content item 302 may be displayed simultaneously on desktop 300A and 300B where the collaboration is in substantially real time (synchronous collaboration), or the corresponding interactions by the different users captured in these figures may occur at different times (asynchronous collaboration). In this example, content item 302 is a word processing document and is displayed in FIGS. 3A and 3B by native application 255 such as a word processor, on both desktops 300A and 300B.

Additionally, content item 302 is displayed concurrently with activity feed 306 on both desktops 300A and 300B, thereby to provide a currently updated-list or history of content item events and user submitted messages. As such, the events that are specific to content item 302 are reflected essentially in real time as they occur on any device that has access to the content item 302. In this example, activity feed 306 includes event notifications 308 and 310, scroll button 316 for controlling displaying other event notifications, and interaction icon 312 for selectively displaying activity feed 306 (e.g., displaying or hiding activity feed 306). The event notifications are associated with the section of the content item that is being presented to the user. Activity feed 306 may further include a chat or message interface (not shown) that includes a text field for receiving messages from users or posting comments. Users may interact with a content item via activity feed 306. For example, a user may add a new comment to a content item or interact with an event such as like a comment, mark a comment as resolved, delete or restore another version, and the like.

As shown in FIGS. 3A and 3B, activity feed 306 displays a list of events as event notifications 308 and 310. Each event notification corresponds to one or more events and displays event data associated with the one or more events. As illustrated, event notification 308 corresponds to a first event of a first user commenting on content item 302 and a second event of a second user commenting on the content item 302; the first and second events are both comment type events. The second event is associated with the first event because the second user made the comment to in response to the first user's comment. Event notification 308 accordingly illustrates event data of the first and second events because they are associated with each other. Event notification 308 illustrates event data of the first event such as the user icon of the first user, the content of the first user's comment, the time stamp of the first user's comment, as well as the version (e.g., v2) of content item 302. In addition, event notification 308 illustrates event data of the second event such as the user icon of the second user, the content of the second user's comment, the time stamp of the second user's comment, as well as the version (e.g., v3) of content item 302.

Furthermore, event notification 310 corresponds to a third event of the second user editing content item 302 and a fourth event of the first user viewing the edits made by the second user. The fourth event is a view-type event and is associated with the third event that is an edit-type event because the first user has viewed the edits made by the second user. Event notification 310 illustrates event data of the third event such as the user icon of the second user who edits the content item, the details of the edits, the time stamp of the edits, as well as the content item version (e.g., v3) associated with the edits. In addition, event notification 310 illustrates event data of the fourth event such as the user icon of the first user who has viewed the edits made by the second user, the time stamp of the first user viewing the edits, as well as the content item version (e.g., v3) associated with the edits. Additionally, as shown in FIGS. 3A-B, within each event notification, event data of events is presented chronologically according to the time stamps associated with the events. Additional event notifications that are older or newer in time, or associated with other sections of the content item can be viewed by scrolling up or down using scroll button 316. In addition, as different users may retrieve, create, and/or work on different versions of a content item, the concurrent display of event notifications associated with different versions of a content item provides users with a more complete view of the overall history and development of the content item.

Similarly, FIGS. 4A and 4B show content item 302 being displayed on desktop 300A to the first user and on desktop 300B to the second user reflecting changes made by a third user. In this example, event notification 408 corresponds to the first event of a first user commenting on content item 302, the second event of a second user commenting on content item 302, and a fifth event of the third user commenting on content item 302. The first and second events are described previously with respect to FIGS. 3A and 3B. The first, second, and fifth events are all comment-type events. The fifth event is associated with the second event because the third user made the comment in response to the second user's comment corresponding to the second event. Similar to event notification 308 shown in FIGS. 3A and 3B, event notification 408 accordingly illustrates event data of the first, second, and fifth events because they are associated with each other. In addition to the event data of first and second events shown in event notification 308 in FIGS. 3A and 3B, event notification 408 further illustrates event data of the fifth event such as the user icon of the third user, the content of the third user's comment, the time stamp of the third user's comment, as well as the version (e.g., v4) of the content item 302.

Furthermore, event notification 410 corresponds to the third event of the second user editing content item 302, the fourth event of the first user viewing the edits made by the second user, and a sixth event of the third user viewing the edits made by the second user. The third and fourth events are described previously with respect to FIGS. 3A and 3B. The sixth event is a view-type event and is associated with the third event that is an edit-type event because the third user has viewed the edits made by the second user. Similar to event notification 310 shown in FIGS. 3A and 3B, event notification 410 illustrates event data of the third event, of the fourth event, as well as of the sixth event because they are associated with each other. In addition to the event data of the third and fourth events shown in event notification 310 in FIGS. 3A and 3B, event notification 410 further illustrates event data of the sixth event such as the user icon of the third user who has viewed the edits made by the second user, the time stamp of the third user viewing the edits, as well as the content item version (e.g., v3) associated with the edits.

Furthermore, as illustrated in FIG. 4B, additional event notification 412 is illustrated by using scroll button 316. Event notification 412 corresponds to a seventh event of the third user editing the content item 302. Event notification 412 includes event data of the seventh event such as the user icon of the third user who edits the content item, the details of the edits, the time stamp of the edits, as well as the content item version associated with the edits. Additional event notifications that are older or newer in time, or associated with other sections of the content item can be viewed by scrolling up or down using scroll button 316. Additionally, as shown in FIGS. 4A-B, within each event notification, event data of events is organized chronologically.

In addition, as different users may retrieve, create, and/or work on different versions of a content item, the concurrent display of event notifications associated with different versions of a content item provides users with a more complete view of the overall history and development of the content item. The third user accepted the edits made by the second user, thus the most recent version (e.g., v4) of content item 302 is illustrated. The edits made by the second user are no longer tracked and only the edits made by the third user are tracked in the view of native application 255. However, the details of the second user's edits are still illustrated in activity feed 306.

FIG. 5 shows content item 302 displayed on desktop 300C to a fourth user in a web preview of content item 302 as displayed by web browser 250. In this example, the device of desktop 300C displaying content item 302 does not include client application 200. Thus, the fourth user has logged into their user account with content management system 110 though a webpage to access their content items. In order to view a content item in a web preview, content management system 110 accesses the content item, converts the content item from the format of its native application to a preview format, such as PDF, and renders the content item for display in a web browser. In this case, a user can view the content items as web previews or download a content item for local editing or viewing, however, changes made to a content item that is downloaded from the web cannot be synchronized with content management system 110. The web preview, thus, enables the fourth user to view revisions to a content item 302 made by other users and updates to activity feed 306 in substantially real time or upon refreshing the browser, for example.

Activity feed 306 for a web preview, however, still includes activity feed 306 that displays event notifications 508 and 512. Event notification 508 corresponds to the first event of a first user commenting on content item 302, the second event of a second user commenting on content item 302, the fifth event of the third user commenting on content item 302, and an eighth event of a fourth user commenting on content item 302. The first and second events are described above with respect to FIGS. 3A and 3B, and the fifth event is described above with respect to FIGS. 4A and 4B. The first, second, fifth, and eighth events are all comment-type events. The eighth event is associated with the fifth event because the fourth user made the comment in response to the third user's comment. Similar to event notification 308 shown in FIGS. 3A and 3B and event notification 408 shown in FIGS. 4A and 4B, event notification 508 accordingly illustrates event data of the first, second, fifth, and eighth events because they are associated with each other. The fourth user may be unable to make their desired changes; however, they can comment on content item 302 so that other users can make the edits.

Additionally, event notification 512 corresponds to the seventh event of the second user editing content item 302 and a ninth event of the fourth user viewing the edits made by the second user. The seventh event is described above with respect to FIGS. 4A and 4B. The ninth event is a view-type event and is associated with the seventh event that is an edit-type event because the fourth user has viewed the edits made by the third user. Similar to event notification 310 shown in FIGS. 3A and 3B and event notification 410 shown in FIGS. 4A and 4B, event notification 512 illustrates event data of the seventh event and the ninth event because they are associated with each other.

In the illustrated example, the fourth user minimizes event notification 410 illustrated in FIGS. 4A and 4B. Event notifications corresponding to users opening or closing content items may be for user views should be displayed to other users in activity feed 306 may be configured to be muted. The examples illustrated in FIGS. 3A through 5 therefore do not show event notifications corresponding to first through fourth users opening and closing content item 302.

Figure 6:
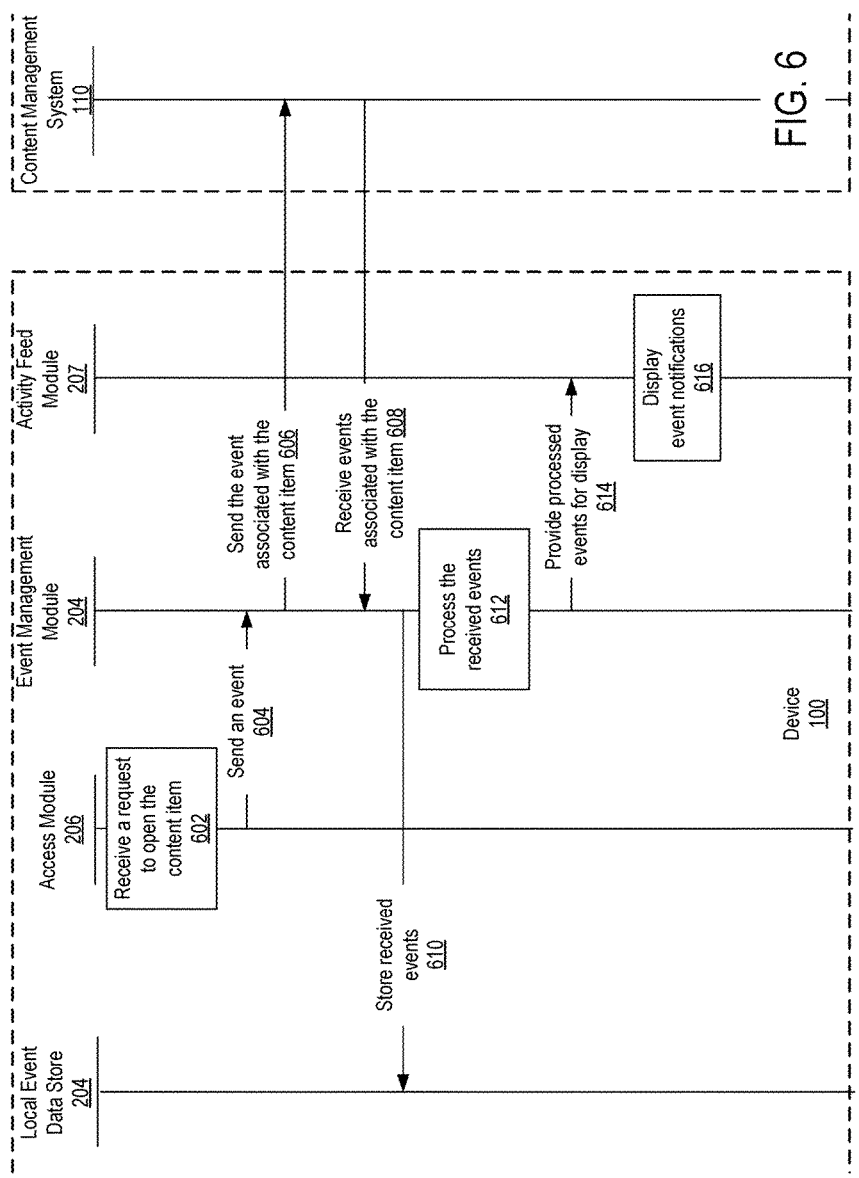
FIG. 6 shows an interaction diagram for displaying activity information for a content item, according to one embodiment.

FIG. 6 shows an interaction diagram for providing events for displaying in activity feed 306 in response to receiving a request from device 100 to display content item 302. In this example, native client application 255 sends a request to launch content item 302 from a file folder. The request is received 602 by access module 206 of client application 200. In response to the request, access module 206 generates an event corresponding to the user's requesting to open content item 302. The event includes the associated event data such as the user ID associated with the user, the time stamp, the retrieve event type, the content item ID of content item 302, the version of content item 302, and the like. Access module 206 sends 604 the generated event including the associated event data to event management module 204, and is one means for performing this function. Access module 206 generates events corresponding to the user's interaction with content items. Example interaction with the content item include the user retrieving, opening, closing, commenting on, editing, viewing edits, private chat messages with other users, creating new versions of, and the like.

Subsequently, event management module 204 sends the event associated with content item 302 to content management system 110. Event management module 204 may send the event in real time to content management system 110 responsive to content item 302 being opened or retrieved at client application 200. In addition, in response to the user's request to open content item 302, content management system 110 sends 608 events related to content item 302 to event management module 204. Content management system 110 sends cumulative events including event data that are associated with content item 302 to event management module 204. In some embodiments, the cumulative events may include all events associated with content item 302 that content management system 110 has received. Alternatively, the cumulative events may include only events associated with content item 302 that content management system 110 has received since the most recent time point of content management system 110 sending events to event management module 204. Event management module 204 may provide a time stamp of the latest event associated with content item 302 stored in local event data store 204 or content management system 110 may track sending events to event management module 204. Event management module 204 may store 610 the received events at event data store 204. Event data store 204 may include multiple sub-data stores and each sub-data store is configured to store events of a particular event type.

Event management module 204 processes 612 the received events. Event management module 204 may process the received events according to the event data associated with the received events. For example, event management module 204 may organize the received events according to the event types, the event time stamp, and/or the content item version. Event management module 204 may associate events based on the event data associated with the received events. For example, event management module 204 may associate a first event with a comment event type with a second event with a comment event type if the comment corresponding to the second event is made in response to the comment corresponding to the first event. Event management module 204 may associate a first view-type event with a second edit-type event if a first user corresponding to the first event has seen edits corresponding to the second event. Event management module 204 may update the event data associated with the events to reflect that the first and second events are associated with each other.

Event management module 204 provides 614 the processed events to activity feed module 207 for display. Activity feed module 207 displays a list of event notifications corresponding to the processed events and the associated event data provided by event management module 204. An event notification may correspond to one or more events. For example, an event notification may correspond to multiple events that are associated with each other. Activity feed module 207 displays the event notifications according to an order of the events received from event management module 204 in the activity feed. An event notification may display event data of the corresponding events such as the user ID or the corresponding user icon, the time stamp, the event content (e.g., details of edits, texts or images of a comment, texts or images of a message, etc.), or a version of the content item. In some embodiments, activity feed module 207 may generate an image to present the event content in an event notification. For example, an event notification may include a preview of a user's edits of a content item. In some embodiments, activity feed module 207 may generate an image to present a previous version of the content item in an event notification.

Figure 7:
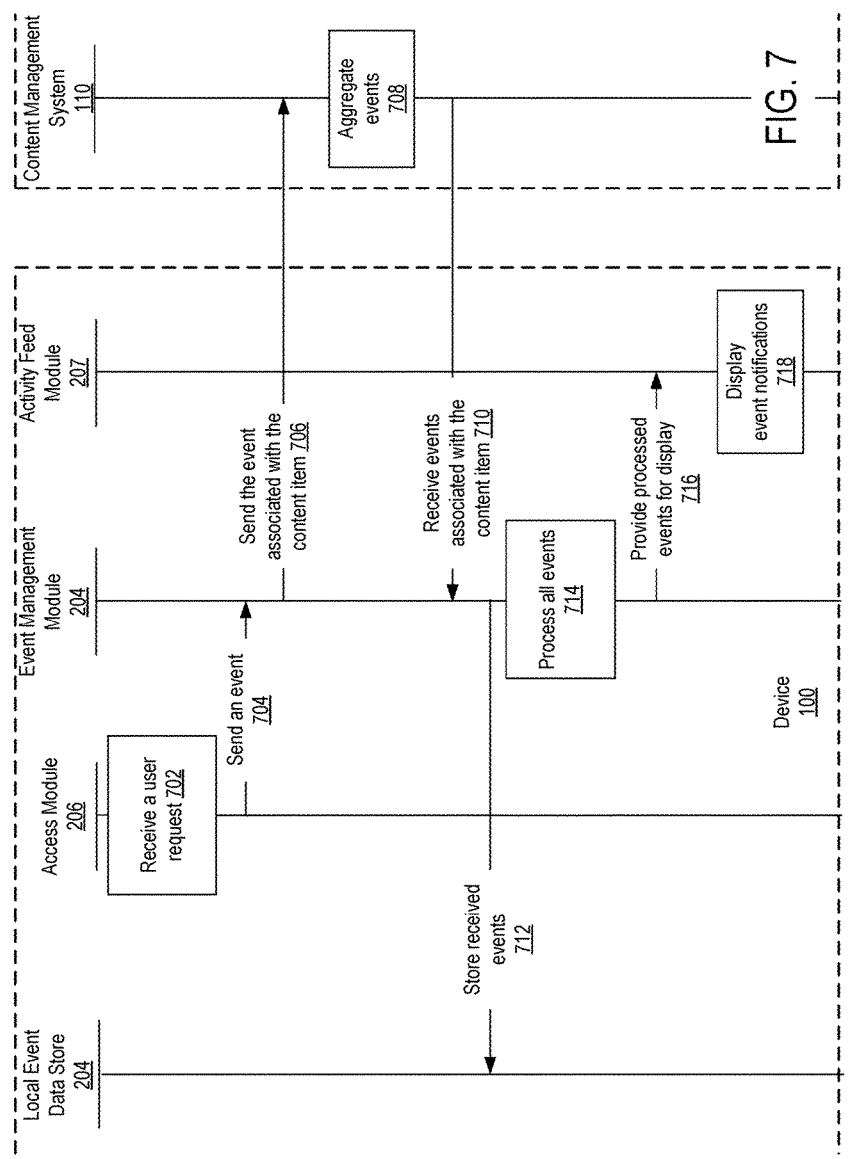
FIG. 7 shows an interaction diagram for displaying activity information for a content item, according to one embodiment.

FIG. 7 illustrates an interaction diagram for displaying events related to content item 302 on client device 100. In this example, a user views, edits, and/or comments on content item 302 and/or messages other users via native client application 255. Access module 206 receives 702 a user request from client application 200 to interact with content item 302. For example, the client may request to view a version of content item 302, to edit content item 302, to comment on content item 302, and view a comment on content item 302, to message another collaborator of content item 302, and the like. In response to the user request, access module 206 generates an event corresponding to the user's requested interaction with content item 302. Example interaction with the content item includes the user retrieving, opening, closing, commenting on, editing, viewing interactions such as comments or edits, public or private chat messages with other users, creating new versions of a content item, and the like. The event includes the associated event data such as the user ID associated with the user, the time stamp, the event type (e.g., view, edit, comment, message, etc.), the content of the event (e.g., details of an edit, texts and/or images of a comment, texts and/or images of a message, etc.), an associated event, content item ID of content item 302, the version of content item 302, and the like. Access module 206 sends 704 the generated event including the associated event data to event management module 204, and is one means for performing this function.

Event management module 204 sends 706 the event to content management system 110. Event management module 204 may send events corresponding to the user's interactions with content item 302 to content management system 110 in real time when the user is interacting with content item 302. Simultaneously, content management system 110 aggregates 708 events related to content item 302. Content management system 110 may receive from a set of other devices (not shown) where other users are also working on content item 302. Periodically, content management system 110 sends 710 the aggregated events related to content item 302 to event management module 204. Event management module 204 may store 712 the received aggregated events at event data store 204.

Event management module 204 processes 714 events related to content item 302 that event management module 204 has received from content management system 110. That is, event management module 204 may process the received events at block 710 along with other events related to content item 302 that event management module 204 received from content management system 110. Event management module 204 may process the events according to the associated event data. For example, event management module 204 may also organize the received events according to the event types, the event time stamp, and/or the content item version. Event management module 204 may associate events based on the event data associated with the received events. For example, event management module 204 may associate a first comment type event with a second comment type event if the second event is made in response to the first event. Event management module 204 may associate a first view event with a second edit type event if a first user corresponding to the first event has seen edits corresponding to the second event. Event management module 204 may update the event data associated with the events to reflect that the first and second events are associated with each other.

Event management module 204 provides 716 the processed events to activity feed module 207 for display. Activity feed module 207 displays 718 a list of event notifications corresponding to the processed events and the associated event data provided by event management module 204. An event notification may correspond to one or more events. For example, an event notification may correspond to multiple events that are associated with each other. Activity feed module 207 displays the event notifications according to an order of the events received from event management module 204 in the activity feed. An event notification may display event data of the corresponding events such as the user ID or the corresponding user icon, the time stamp, the event content (e.g., details of edits, texts or images of a comment, texts or images of a message, etc.), or a version of the content item. In some embodiments, activity feed module 207 may generate a preview of event content in an event notification. In some embodiments, activity feed module 207 may generate an image to present a previous version of the content item in an event notification.

Figure 8:
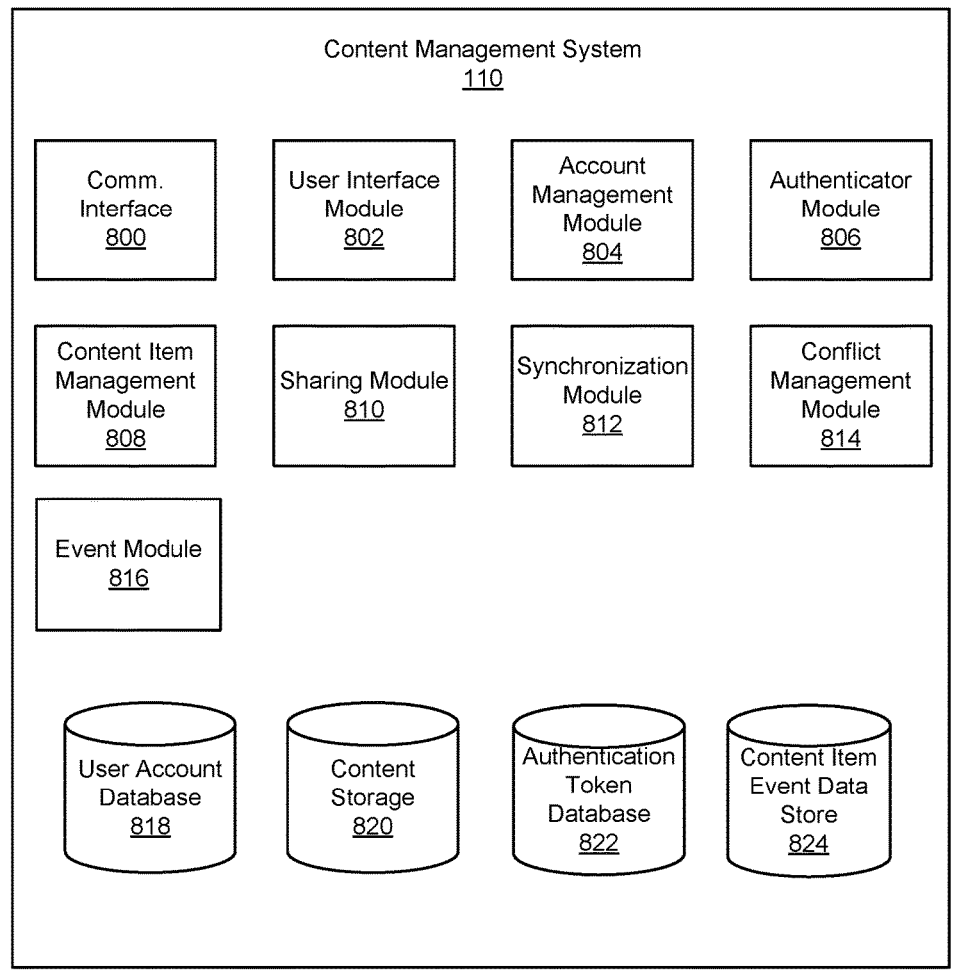
FIG. 8 shows components of a content management system, according to one embodiment.

FIG. 8 shows components of content management system 110 of FIG. 1, according to one embodiment. In one configuration, components described below with reference to content management system 110 are incorporated into devices 100 that share and synchronize content items without management by content management system 110. These devices 100 may synchronize content and share interaction information over network 120 or via a direct connection as described above. In this configuration, devices 100 may incorporate functionality of synchronization module 812, conflict management module 814, event synchronization module 816, and other modules and data stores for incorporating functionality described below as provided by content management system 110. Accordingly, devices 100 in this configuration operate in a peer-to-peer configuration and may do so without content management system 110 or network 120.

When using content management system 110, to facilitate the various content management services, a user can create an account with content management system 110. The account information can be maintained in user account database 818, and is one means for performing this function. User account database 818 can store profile information for registered users. In some cases, the only personal information in the user profile can be a username and/or email address. However, content management system 110 can also be configured to accept additional user information, such as password recovery information, demographics information, payment information, and other details. Each user is associated with an identifier, such as a user ID or a user name.

User account database 818 can also include account management information, such as account type, e.g., free or paid; usage information for each user, e.g., file edit history; maximum storage space authorized; storage space used; content storage locations; security settings; personal configuration settings; content sharing data; etc. Account management module 804 can be configured to update and/or obtain user account details in user account database 818. Account management module 804 can be configured to interact with any number of other modules in content management system 110.

An account can be associated with multiple devices 100, and content items can be stored in association with an account. The stored content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photo folder that is intended for photo content items and that provides specific attributes and actions tailored for photos; an audio folder that provides the ability to play back audio file content items and perform other audio related actions; or other special purpose folders. An account can also include shared folders or group folders that are linked with and available to multiple user accounts. The permissions for multiple users may be different for a shared folder. In one embodiment, the account is a namespace that may be associated with several users, each of whom may be associated with permissions to interact with the namespace.

The content can be stored in content storage 820, which is one means for performing this function. Content storage 820 can be a storage device, multiple storage devices, or a server. Alternatively, content storage 820 can be a cloud storage provider or network storage accessible via one or more communications networks. In one configuration, content management system 110 stores the content items in the same organizational structure as they appear on the device. However, content management system 110 can store the content items in its own order, arrangement, or hierarchy.

Content storage 820 can also store metadata describing content items, content item types, and the relationship of content items to various accounts, folders, or groups. The metadata for a content item can be stored as part of the content item or can be stored separately. In one configuration, each content item stored in content storage 820 can be assigned a system-wide unique identifier.

Content storage 820 can decrease the amount of storage space required by identifying duplicate content items or duplicate segments of content items. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 820 stores content items using a version control mechanism that tracks changes to content items, different versions of content items (such as a diverging version tree), and a change history. The change history includes a set of changes that, when applied to the original content item version, produces the changed content item version.

Content management system 110 automatically synchronizes content items from one or more devices, using synchronization module 812, which is one means for performing this function. The synchronization is platform-agnostic. That is, the content items are synchronized across multiple devices 100 of varying type, capabilities, operating systems, etc. For example, client application 200 synchronizes, via synchronization module 812 at content management system 110, content in the file system of device 100 with the content items in an associated user account on system 110. Client application 200 synchronizes any changes to content items in a designated folder and its sub-folders with the synchronization module 812. Such changes include new, deleted, modified, copied, or moved files or folders. Synchronization module 812 also provides any changes to content associated with device 100 to client application 200. This synchronizes the local content at device 100 with the content items at content management system 110.

Conflict management module 814 determines whether there are any discrepancies between versions of a content item located at different devices 100. For example, when a content item is modified at one device and a second device, differing versions of the content item may exist at each device. Synchronization module 812 determines such versioning conflicts, for example by identifying the modification time of the content item modifications. Conflict management module 814 resolves the conflict between versions by any suitable means, such as by merging the versions, or by notifying the device of the later-submitted version.

A user can also view or interact with a content item via a web interface generated by user interface module 802. For example, the user can navigate in web browser 250 to a web address provided by content management system 110. Changes or updates to content in content storage 620 made through the web interface, such as uploading a new version of a file, are synchronized back to other devices 100 associated with the user's account. Multiple devices 100 may be associated with a single account and files in the account are synchronized between each of the multiple devices 100.

Content management system 110 includes communications interface 800 for interfacing with various devices 100, and with other content and/or service providers via an Application Programming Interface (API), which is one means for performing this function. Certain software applications access content storage 820 via an API on behalf of a user. For example, a software package, such as an app on a smartphone or tablet computing device, can programmatically make calls directly to content management system 110, when a user provides credentials, to read, write, create, delete, share, or otherwise manipulate content. Similarly, the API can allow users to access all or part of content storage 820 through a web site.

Content management system 110 can also include authenticator module 806, which verifies user credentials, security tokens, API calls, specific devices, etc., to determine whether access to requested content items is authorized, and is one means for performing this function. Authenticator module 806 can generate one-time use authentication tokens for a user account. Authenticator module 806 assigns an expiration period or date to each authentication token. In addition to sending the authentication tokens to requesting devices, authenticator module 806 can store generated authentication tokens in authentication token database 822. Upon receiving a request to validate an authentication token, authenticator module 806 checks authentication token database 822 for a matching authentication token assigned to the user. Once the authenticator module 806 identifies a matching authentication token, authenticator module 806 determines if the matching authentication token is still valid. For example, authenticator module 806 verifies that the authentication token has not expired or was not marked as used or invalid. After validating an authentication token, authenticator module 806 may invalidate the matching authentication token, such as a single-use token. For example, authenticator module 806 can mark the matching authentication token as used or invalid, or delete the matching authentication token from authentication token database 822.

Content management system 110 includes sharing module 810 for sharing content publicly or privately. Sharing content publicly can include making the content item accessible from any computing device in network communication with content management system 110. Sharing content privately can include linking a content item in content storage 820 with two or more user accounts so that each user account has access to the content item. The content can also be shared across varying types of user accounts.

In some embodiments, content management system 110 includes content management module 808 for maintaining a content directory that identifies the location of each content item in content storage 820, and allows client applications to request access to content items in the storage 820, and which is one means for performing this function. A content entry in the content directory can also include a content pointer that identifies the location of the content item in content storage 820. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

To share a content item privately, sharing module 810 adds a user account identifier to the content entry associated with the content item, thus granting the added user account access to the content item. Sharing module 810 can also be configured to remove user account identifiers from a content entry to restrict a user account's access to the content item.

To share content publicly, sharing module 810 generates a custom network address, such as a URL, which allows any web browser to access the content in content management system 110 without any authentication. Sharing module 810 includes content identification data in the generated URL, which can later be used by content management system 110 to properly identify and return the requested content item. For example, sharing module 810 can be configured to include the user account identifier and the content path in the generated URL. The content identification data included in the URL can be transmitted to content management system 110 by a device to access the content item. In addition to generating the URL, sharing module 810 can also be configured to record that a URL to the content item has been created. In some embodiments, the content entry associated with a content item can include a URL flag indicating whether a URL to the content item has been created.

Event synchronization module 816 manages synchronization of events among user devices for content management system, and is one means for performing this function. Event synchronization module 816 receives events including the associated event data that are related to a content item from all devices where the content item is being opened. That is, event synchronization module 816 receives events corresponding to user interactions from all devices where users are interacting with the content item. Event synchronization module 816 receives events corresponding to interactions with the content item from devices in real time. In addition, event synchronization module 816 sends the events received from all devices where a content item is being opened to those devices. Event synchronization module 816 may send the events to the devices periodically such that interactions with the content item by different users are synchronized among all users. Event synchronization module 816 may store the events in content item event data store 824 of content management system 110.

Figure 9:
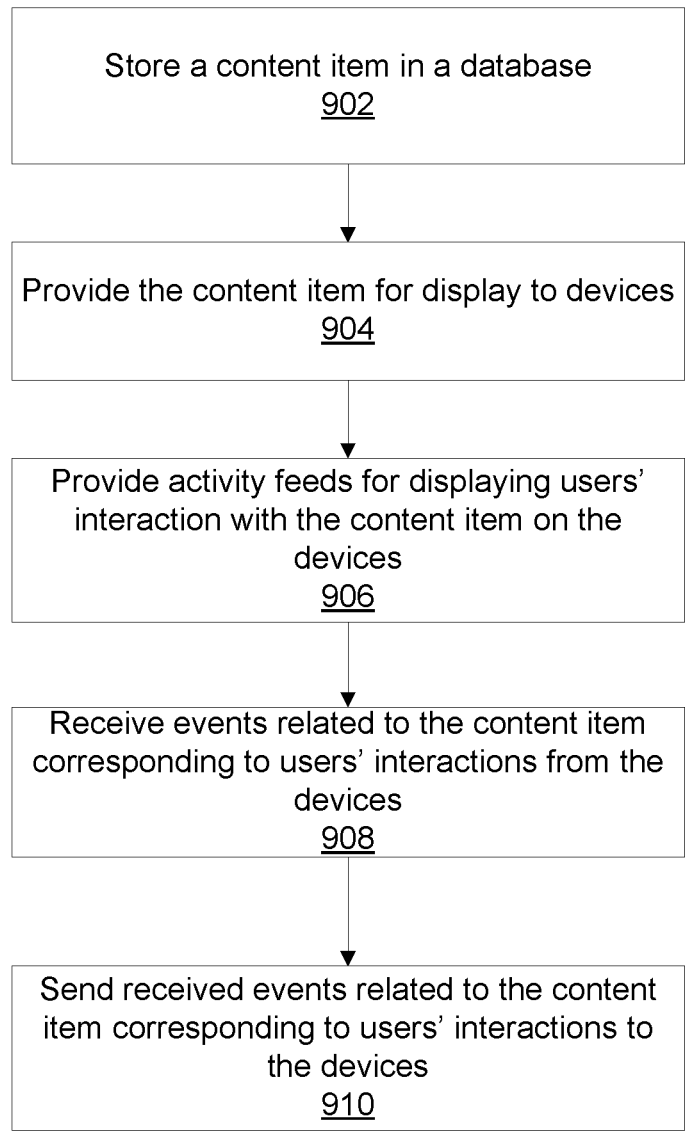
FIG. 9 shows an example process for providing event information for display to collaborators of a content item, according to one embodiment.

FIG. 9 illustrates an example process for providing activity feeds illustrating users' interaction with a content item, according to one embodiment. Content management system 110 stores 902 content data for content item 302 in content storage 820 that can be retrieved by users authorized to access content item 302. For example, a first user creates content item 302 via native application 255 on device 100 and saves content item 302 to their account with content management system 110. In this example, the first user and one or more other users collaborate on content item 302. Content management system 110 may create a link that a user can use to invite another user to also work on content item 302. In order to grant users access to content item 302, content management system 110 associates metadata with content item 302 indicating that the invited users can now save content item 302 with their user account and have content item 302 synchronized across all users via synchronization module 812 and event synchronization module 816. Accordingly, content management system 110 provides 904 shared content item 302 for display to each user.

In order to facilitate the various features herein, content management system 110 maintains content data of content item 302. Content management system 110 maintains content data of content item 302 for multiple versions in content storage 820. Additionally, content management system 110 may also maintain version data of content item 302 in content storage 820.

Content management system 110 provides 906 activity feeds 306 for display with content item 302 to the users on devices 100. Activity feed 306, though provided for display with content item 302, is separate from the content data of content item 302 and separate from native application 255 associated with content item 302. Activity feed 306 displays users' interactions with the content item such as edits, views, comments, and/or messages to other users. Activity feed 306 displays a set of event notifications corresponding to the users' interactions. In one example, content item 302 is displayed by native application 255 and activity feed 306 is provided by content management system 110 in a layer separate from native application 255.

Content management system 110 receives 908 events related to content item 302 from devices 100. The received events correspond to users' interactions with content item 302 and comprise event data. A Device 100 may send an event corresponding to a user's interaction with content item 302 in real time. Users' interactions with the content item include, for example, when a user reviews the content item, edits the content item (i.e., changes the content data of a content item), views changes made to the content item by other users, comments on the content item, views other users' comments on the content item, renames the content item, creates a new version of the content item, shares the content item, and so forth. Event data, for example, includes an event ID, a time stamp associated with the event, an event type (e.g., comment, view, edit, retrieve/open, save/close) associated with the event, the content (e.g., texts and/or images of the comment, the specifics of the edit) of the event, a content item version, a user ID, a device ID, and one or more associated events. Content management system 110 may store the received events in content item event data store 824. Content item event data store 824 may comprise a sub-store for storing edit type events, a sub-store for storing view type events, and a sub-store for storing comment type events. Users' interactions with content item 302, that is, events related to content item 302, are maintained separately from the content data of content item 302.

Content management system 110 sends received events related to content item 302 to devices 100. Content management system 110 sends events comprising event data to devices 100 periodically. Content management system 110 sends events to device 100 for display with content item 302 in activity feed 306. As such, users' interaction with content item 302 is synchronized among devices 100. Activity feed 306 includes a list of event notifications corresponding to events provided by content management system 110 to device 100. Device 100 may process events received from content management system 100 for generating event notifications in activity feed 306. Device 100 may process events, for example, based on event data. An event notification in activity feed 306 may correspond to one or more events related to content item 302. Events associated with each other may be presented in one event notification. In one embodiment, activity feed 306 displays a preview of a user's edits of content item 302. In one embodiment, activity feed 306 displays an event notification of a user viewing another user's edits or comment.

Content management system 110 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1 G or more of main memory, as well as 500 Gb to 2 Tb of computer readable, persistent storage, and running an operating system such as LINUX or variants thereof. The operations of content management system 110 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, failover servers, network management tools and so forth are not shown so as not to obscure the features of the system. Finally, the functions and operations of content management system 110 are sufficiently complex as to require implementation on a computer system, and cannot be performed in the human mind simply by mental steps.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented by a combination of hardware and software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method executed by a content management system, comprising:
    storing a content item including content data in a database, the content item synchronized between a set of users each with permission to edit the content data of the content item, the set of users including a first user and a second user;
    providing the content item for display by a native application in a first interface window controlled by the native application of each of a first computing device and a second computing device;
    providing to each of the first computing device and the second computing device a corresponding activity feed separate from the content data and displayed by a client application in a second interface window controlled by the client application, the client application different from the native application and the second interface window different from the first interface window;
    receiving from the first computing device a first set of events corresponding to the first user's interactions with the content item via the native application in real time;
    receiving from the second computing device a second set of events corresponding to the second user's interactions with the content item via the native application in real time; and
    updating the activity feed displayed in the second activity window by each of the first computing device and the second computing device to include the first set of events and the second set of events, the activity feed including a first event from the first set of events, the first event including a preview of an edit made to the content data of the content item by the first user, the activity feed further including a second event from the second set of events indicating that the second user has seen the first user's edit.

2. The method of claim 1, wherein the content item is associated with a plurality of versions of the content item, the method further comprising:
    maintaining the content data for each of the plurality of versions of the content item in a content storage of the content management system; and
    maintaining, separate from the content data, version data associated with creation of each version in the content storage of the content management system.

3. The method of claim 1, wherein the first interface window is displayed in a first graphical user interface layer, and wherein the second interface window is displayed in a second graphical user interface layer separate from the first graphical user interface layer.

4. The method of claim 1, wherein each event includes event data comprising an event type corresponding to a type of the interaction, a time stamp of the interaction, a content of the event, and a content item version.

5. A method executed by a computing device, comprising:
    receiving a content item including content data from a content management system for display to a first user via a first computing device, the content item additionally displayed to a second user via a second computing device;
    displaying the content item in a native application in a first interface window controlled by the native application of the first computing device associated with the content item;
    displaying an activity feed in a second interface window controlled by a client application of the first computing device, the client application different from the native application and the second interface window different from the first interface window, the displayed activity feed including a list of interaction notifications provided by the content management system;
    providing a first set of events corresponding to the first user's interactions with the content item via the native application in real time to the content management system, the content management system receiving a second set of events corresponding to the second user's interactions with the content item via the native application in real time;
    receiving the first set and the second set of events from the content management system; and
    modifying the displayed activity feed to include a set of event notifications within the displayed activity feed, the set of event notifications including a first event notification, the first event notification including a preview of an edit made to the content item by the first user, and further including a second event notification, the second event notification indicating that the second user has seen the first user's edits.

6. The method of claim 5, wherein each event includes event data comprising an event type corresponding to a type of the interaction, a time stamp of the interaction, a content of the event, and a content item version.

7. The method of claim 5, wherein a first event of the first set of events and a second event of the second set of events are displayed in one event notification.

8. A non-transitory computer-readable storage medium storing instructions that, when executed by at least one processor, cause a computing device to:
    store a content item in a database, the content item comprising content data, the content item synchronized between a set of users each with permission to edit the content data of the content item, the set of users including a first user and a second user;
    provide the content item for display by a native application in a first interface window controlled by the native application of each of a first computing and a second computing device;
    provide to each of the first computing device and the second computing device a corresponding activity feed separate from the content data and displayed by a client application in a second interface window controlled by the client application, the client application different from the native application and the second interface window different from the first interface window;
    receive from the first computing device a first set of events corresponding to the first user's interactions with the content item via the native application in real time;

receive from the second computing device a second set of events corresponding to the second user's interactions with the content item via the native application in real time; and update the activity feed displayed in the second activity window by each of the first computing device and the second computing device to include the first set of events and the second set of events, the activity feed including a first event from the first set of events, the first event including a preview of an edit made to the content data of the content item by the first user, the activity feed further including a second event from the second set of events indicating that the second user has seen the first user's edit.

9. The non-transitory computer-readable storage medium of claim 8, wherein the content item is associated with a plurality of versions of the content item, further comprising instructions that cause the computing device to:

maintain the content data for each of the plurality of versions of the content item in a content storage of the content management system; and maintain, separate from the content data, version data associated with creation of each version in the content storage of the content management system.

10. The non-transitory computer-readable storage medium of claim 8, wherein the first interface window is displayed in a first graphical user interface layer, and wherein the second interface window is displayed in a second graphical user interface layer separate from the first graphical user interface layer.

11. The non-transitory computer-readable storage medium of claim 8, wherein each event includes event data comprising an event type corresponding to a type of the interaction, a time stamp of the interaction, a content of the event, and a content item version.

12. A system comprising:

a processor configured to execute instructions;

a non-transitory, non-volatile storage medium containing instructions that when executed by the processor cause the processor to:

store a content item in a database, the content item comprising content data, the content item synchronized between a set of users each with permission to edit the content data of the content item, the set of users including a first user and a second user;

provide the content item for display by a native application in a first interface window controlled by the native application of each of a first computing device and a second computing;

provide to each of the first computing device and the second computing device a corresponding activity feed separate from the content data and displayed by a client application in a second interface window controlled by the client application, the client application different from the native application and the second interface window different from the first interface window;

receive from the first computing device a first set of events corresponding to the first user's interactions with the content item via the native application in real time;

receive from the second computing device a second set of events corresponding to the second user's interactions with the content item via the native application in real time; and update the activity feed displayed in the second activity window by each of the first computing device and the second computing device to include the first set of events and the second set of events, the activity feed including a first event from the first set of events, the first event including a preview of an edit made to the content data of the content item by the first user, the activity feed further including a second event from the second set of events indicating that the second user has seen the first user's edit.

13. The system of claim 12, wherein the content item is associated with a plurality of versions of the content item, and wherein the non-transitory, non-volatile storage medium containing instructions that when executed by the processor further cause the processor to:

maintain the content data for each of the plurality of versions of the content item in a content storage of the content management system; and maintain, separate from the content data, version data associated with creation of each version in the content storage of the content management system.

14. The system of claim 12, wherein the first interface window is displayed in a first graphical user interface layer, and wherein the second interface window is displayed in a second graphical user interface layer separate from the first graphical user interface layer.

15. The system of claim 12, wherein each event includes event data comprising an event type corresponding to a type of the interaction, a time stamp of the interaction, a content of the event, and a content item version.

* * * * *